United States Patent [19]

Miyoshi et al.

[11] Patent Number: 5,393,605
[45] Date of Patent: Feb. 28, 1995

[54] ZINCIFEROUS PLATED STEEL SHEET EXCELLENT IN PRESS-FORMABILITY AND CORROSION RESISTANCE

[75] Inventors: Tatsuya Miyoshi; Toshiyuki Okuma; Masaaki Yamashita; Toyofumi Watanabe, all of Tokyo; Norio Kosaka, Osaka, all of Japan

[73] Assignee: NKK Corporation, Tokyo, Japan

[21] Appl. No.: 94,077

[22] PCT Filed: Dec. 10, 1992

[86] PCT No.: PCT/JP92/01618
§ 371 Date: Jul. 22, 1993
§ 102(e) Date: Jul. 22, 1993

[87] PCT Pub. No.: WO93/11880
PCT Pub. Date: Jun. 24, 1993

[30] Foreign Application Priority Data

Dec. 12, 1991 [JP] Japan .................. 3-351632
Dec. 26, 1991 [JP] Japan .................. 3-360082

[51] Int. Cl.[6] ........................................... B32B 15/08
[52] U.S. Cl. ..................................... 428/327; 428/328; 428/331; 428/336; 428/341; 428/425.8; 428/469
[58] Field of Search ............... 428/328, 331, 336, 341, 428/425.8, 423, 469, 327; 524/407, 435, 492, 493, 507, 780, 783, 871

[56] References Cited
FOREIGN PATENT DOCUMENTS 61-60886 3/1986 Japan .
62-289275 12/1987 Japan .
1-110140 4/1989 Japan .
2-140294 5/1990 Japan .
2-194946 8/1990 Japan .
3-232572 10/1991 Japan .
3-237173 10/1991 Japan .

Primary Examiner—D. S. Nakarani
Attorney, Agent, or Firm—Frishauf, Holtz, Goodman & Woodward

[57] ABSTRACT

A zinciferous plated steel sheet excellent in press-formability and corrosion resistance, which comprises: a steel sheet, a zinciferous plating layer formed on at least one surface of the steel sheet, a chromate film formed on the zinciferous plating layer, and a resin film formed on the chromate film. The resin film comprises a solvent-base thermosetting resin, a solid internal lubricant and a rust-preventive pigment. The solvent-base thermosetting resin comprises: (A) urethane prepolymer containing a hydroxyl group, and (B) at least one of a block polyisocyanate compound and an amino resin as a curing agent. The urethane prepolymer containing a hydroxyl group comprises: (a) at least one of polyether polyol, polyester polyol and polyether-polyester polyol, (b) an isocyanate compound, and (c) dihydric alcohol. The solid internal lubricant comprises a polyethylene resin, and the content ratio thereof is within a range of from 1 to 30 weight parts relative to 100 weight parts of a solid component in the solvent-base thermosetting resin. The rust-preventive pigment comprises at least one of a chromate compound or silica, and the content ratio thereof is within a range of from 3 to 30 weight parts relative to 100 weight parts of the solid component in the solvent-base thermosetting resin.

6 Claims, 1 Drawing Sheet

ZINCIFEROUS PLATED STEEL SHEET EXCELLENT IN PRESS-FORMABILITY AND CORROSION RESISTANCE

FIELD OF THE INVENTION

The present invention relates to a zinciferous plated steel sheet excellent in press-formability and corrosion resistance.

BACKGROUND OF THE INVENTION

A zinciferous plated steel sheet having a zinciferous plating layer comprising zinc or a zinc alloy formed on at least one surface of the steel sheet is widely employed in various sectors of industry because of the excellent corrosion resistance. When using such a zinciferous plated steel sheet as a material for a business machine such as a copying machine, an audio equipment, a home electrical appliance or an automobile body, a press forming is applied to the zinciferous plated steel sheet. When using the zinciferous plated steel sheet as a material for a motor cover or a cartridge-type tank, a drawing forming is applied to the zinciferous plated steel sheet.

As compared with a cold-rolled steel sheet, however, the zinciferous plated steel sheet has a problem of a lower press-formability. More particularly, frictional resistance of the zinciferous plated steel sheet against a forming die during the press forming is larger than frictional resistance of the cold-rolled steel sheet against the forming die. The zinciferous plated steel sheet has therefore a poor lubricity. As a result, a severe press forming, if applied to the zinciferous plated steel sheet, causes a peeloff or a galling in the zinciferous plating layer.

Demand is recently increasing for a zinciferous plated steel sheet, which has a chromate film formed on the zinciferous plating layer by applying a chromating treatment to the zinciferous plated steel sheet and has a more excellent corrosion resistance. The zinciferous plated steel sheet having the chromate film formed on the zinciferous plating layer is excellent in corrosion resistance in the form of a flat sheet, i.e., corrosion resistance before a press forming. However, when applying a press forming to the zinciferous plated steel sheet having a chromate film, the poor press-formability as described above causes a peeloff of the chromate film or a blackish discoloration of the surface of the chromate film. Corrosion resistance and external appearance of the press-formed zinciferous plated steel sheet are thus deteriorated.

As a means to solve the above-mentioned problems, the conventional practice has been to improve lubricity of the zinciferous plated steel sheet by applying a lubricant oil onto the surface thereof prior to press-forming the zinciferous plated steel sheet.

However, application of the above-mentioned lubricant oil onto the surface of the zinciferous plated steel sheet has the following problems:

(a) The applying operation of the lubricant oil causes a complicated manufacturing process;
(b) The lubricant oil stains an operation site, thus polluting a working environment; and
(c) If press forming conditions are severe, a galling may be produced during the press forming even after applying the lubricant oil, thus causing deterioration of corrosion resistance of the press-formed zinciferous plated steel sheet.

As a zinciferous plated steel sheet which solves the above-mentioned problems and is excellent in press-formability and corrosion resistance even without applying a lubricant oil onto the surface thereof, the following zinciferous plated steel sheets are proposed:

(1) A zinciferous plated steel sheet excellent in lubricity and corrosion resistance, disclosed in Japanese Patent Provisional Publication No. 61-60,886 published on Mar. 28, 1986, which comprises: a steel sheet; a zinciferous plating layer formed on at least one surface of said steel sheet; a chromate film formed on said zinciferous plating layer, said chromate film having a weight within a range of from 5 to 200 mg/m$^2$ per surface of said steel sheet; and a composite silicate film formed on said chromate film, which contains a water-dispersing internal lubricant and comprises a water-soluble or water-dispersing organic resin and a water-dispersing silica, said composite silicate film having a thickness within a range of from 0.3 to 3.0 μm (hereinafter referred to as the "prior art 1").

(2) A zinciferous plated steel sheet excellent in workability and lubricity, disclosed in Japanese Patent Provisional Publication No. 62-289,275 published on Dec. 16, 1987, which comprises: a steel sheet; a zinciferous plating layer formed on at least one surface of said steel sheet; and a thermosetting resin film formed on said zinciferous plating layer, which has fluorine resin powder exposed on the surface of said thermosetting resin film (hereinafter referred to as the "prior art 2").

(3) A zinciferous plated steel sheet excellent in corrosion resistance and lubricity, disclosed in Japanese Patent Provisional Publication No. 1-110,140 published on Apr. 26, 1989, which comprises: a steel sheet; a zinciferous plating layer formed on at least one surface of said steel sheet; a chromate film formed on said zinciferous plating layer, said chromate film having a weight within a range of from 3 to 200 mg/m$^2$ per surface of said steel sheet; and an organic resin film formed on said chromate film, which comprises colloidal silica in an amount of from 5 to 40 wt. %, a solid internal lubricant in an amount of from 3 to 20 wt. % surface-treated with a titanate coupling agent, an epoxy resin in an amount of from 2 to 30 wt. %, and the balance being acrylic resin (hereinafter referred to as the "prior art 3").

(4) A zinciferous plated steel sheet excellent in blacking resistance, disclosed in Japanese Patent Provisional Publication No. 2-140,294 published on May 29, 1990, which comprises: a steel sheet; a zinciferous plating layer formed on at least one surface of said steel sheet; a chromate film formed on said zinciferous plating layer; and a montan wax oxide film formed on said chromate film (hereinafter referred to as the "prior art 4").

The prior art 1 has the following problems:

Under severe press-forming conditions, frictional heat produced during the press forming causes deterioration of the composite silicate film formed on the chromate film, thus resulting in sticking of the composite silicate film to the forming die or blackening of the composite silicate film. As compared with the conventional zinciferous plated steel sheet applied with a lubricant oil on the surface thereof, therefore, the zinciferous plated steel sheet of the prior art 1 may become poorer in corrosion resistance and external appearance after the press forming.

The prior art 2 has the following problems:

The fluorine resin powder exposed on the surface of the thermosetting resin film may peel off during the press forming, and accordingly pinholes tend to occur in the zinciferous plating layer. In addition, the thickness of the thermosetting resin film may become non-uniform because of the fluorine resin powder exposed on the surface of the thermosetting resin film.

The prior art 3 has the following problems:

Under severe press-forming conditions, as in the case of prior art 1, frictional heat produced during the press forming causes deterioration of the organic resin film formed on the chromate film, thus in turn causing sticking of the organic resin film to the forming die or blackening of the organic resin film. As compared with the conventional zinciferous plated steel sheet applied with a lubricant oil on the surface thereof, therefore, the zinciferous plated steel sheet of the prior art 3 may become poorer in corrosion resistance and external appearance after the press forming.

The prior art 4 has the following problems:

The montan wax oxide film formed on the chromate film has a low softening point. Under severe press-forming conditions, therefore, frictional heat produced during the press forming causes peeloff of, or damage to, the montan wax oxide film. As compared with the conventional zinciferous plated steel sheet applied with a lubricant oil on the surface thereof, therefore, the zinciferous plated steel sheet of the prior art 4 may become poorer in corrosion resistance and external appearance after the press forming.

In addition to the above-mentioned prior arts 1 to 4, there are proposed zinciferous plated steel sheets each having a resin film comprising one of various resins and one of various solid internal lubricants formed on a chromate film. In these conventional zinciferous plated steel sheet, however, deterioration of the resin film is unavoidable under severe press-forming conditions.

Under such circumstances, there is a strong demand for development of a zinciferous plated steel sheet excellent in press-formability and corrosion resistance, which permits the prevention of peeloff of, or damage to, the resin film formed on the chromate film on the zinciferous plating layer, even under severe press-forming conditions, but such a zinciferous plated steel sheet has not as yet been proposed.

An object of the present invention is therefore to provide a zinciferous plated steel sheet excellent in press-formability and corrosion resistance, which permits the prevention of peeloff of, or damage to, the resin film formed on the chromate film on the zinciferous plating layer, even under severe press-forming conditions.

DISCLOSURE OF THE INVENTION

In accordance with one of the features of the present invention, in a zinciferous plated steel sheet excellent in press-formability and corrosion resistance, which comprises:

a steel sheet;

a zinciferous plating layer formed on at least one surface of said steel sheet;

a chromate film formed on said zinciferous plating layer, said chromate film having a weight within a range of from 5 to 200 mg/m$^2$ as converted into metallic chromium per surface of said steel sheet; and a resin film formed on said chromate film by applying a resin onto said chromate film and then curing same, said resin film having a thickness within a range of from 0.3 to 3.0 μm;

there is provided the improvement wherein:

said resin film comprises a solvent-base thermosetting resin, a solid internal lubricant and a rust-preventive pigment;

said solvent-base thermosetting resin comprises:

(A) urethane prepolymer containing a hydroxyl group and having the following chemical composition:

(a) at least one polyol selected from the group consisting of polyether polyol, polyester polyol and polyether-polyester polyol;

(b) an isocyanate compound, and (c) dihydric alcohol, and (B) at least one of a block polyisocyanate compound and an amino resin as a curing agent;

said solid internal lubricant comprises a polyethylene resin, and the content ratio of said solid internal lubricant is within a range of from 1 to 30 weight parts relative to 100 weight parts of a solid component in said solvent-base thermosetting resin; and said rust-preventive pigment comprises at least one of a chromate compound or silica, and the content ratio of said rust-preventive pigment is within a range of from 3 to 30 weight parts relative to 100 weight parts of said solid component in said solvent-base thermosetting resin.

DETAILED DESCRIPTION OF PREFERRED EMBODIMENTS

Figure 1:
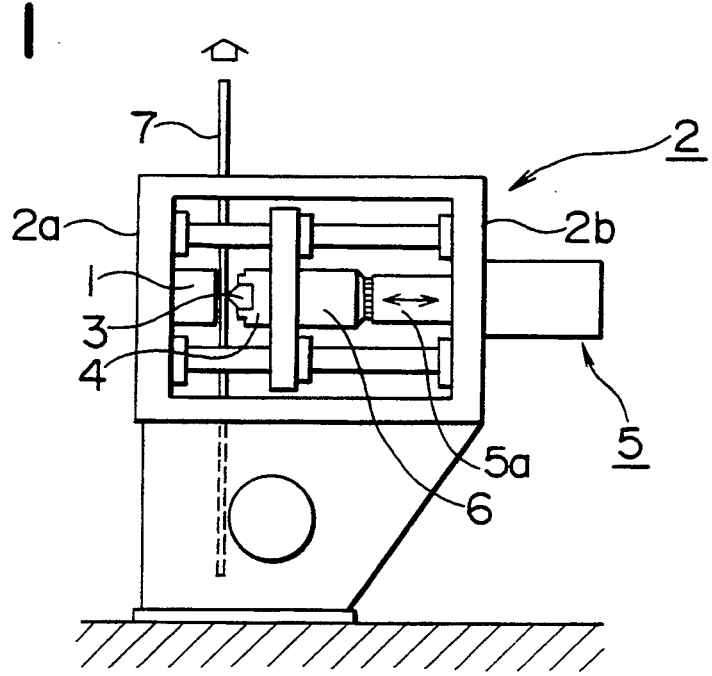
FIG. 1 is a schematic front view illustrating a tester for testing lubricity of a zinciferous plated steel sheet.

From the above-mentioned point of view, extensive studies were carried out to develop a zinciferous plated steel sheet excellent in press-formability and corrosion resistance, which permits the prevention of peeloff of, or damage to, the resin film formed on the chromate film on the zinciferous plating layer, even under severe press-forming conditions.

As a result, the following findings were obtained:

By forming, on the chromate film on the zinciferous plating layer of the zinciferous plated steel sheet, a resin film which comprises a solvent-base thermosetting resin as a base resin, a solid internal lubricant comprising a polyethylene resin, and a rust-preventive pigment comprising at least one of a chromate compound and silica, and the above-mentioned solvent-base thermosetting resin comprising urethane prepolymer containing a hydroxyl group, and a curing agent comprising at least one of a block polyisocyanate compound and an amino resin, it is possible to prevent peeloff of, or damage to, the resin film even when the zinciferous plated steel sheet is press-formed under severe conditions.

The present invention was made on the basis of the above-mentioned findings. The zinciferous plated steel sheet of the present invention, which is excellent in press-formability and corrosion resistance, is described below.

In the present invention, the resin film formed on the chromate film on the zinciferous plating layer comprises a solvent-base thermosetting resin as a base resin, a solid internal lubricant and a rust-preventive pigment.

The reasons of using the solvent-base thermosetting resin as the base resin are as follows:

(1) The solvent-base resin is superior to a water-base resin in mutual solubility with the solid internal lubricant and the rust-preventive pigment, which are added to the resin, and keeps a stable performance for a long period of time.

(2) The thermosetting resin is superior to a thermoplastic resin in mechanical strength at high temperatures. The resin film is therefore hardly peeled off or damaged by frictional heat produced during the press forming.

(3) The solvent-base thermosetting resin therefore has excellent properties described above in (1) and (2) simultaneously.

The solvent-base thermosetting resin of the present invention comprises:

(A) urethane prepolymer containing a hydroxyl group and having the following chemical composition:
  (a) at least one polyol selected from the group consisting of polyether polyol, polyester polyol and polyether-polyester polyol;
  (b) an isocyanate compound, and
  (c) dihydric alcohol, and
(B) at least one of a block polyisocyanate compound and an amino resin as a curing agent.

As polyether polyol composing urethane prepolymer containing a hydroxyl group, there is available, for example, polyethylene glycol, polypropylene glycol, or straight-chain polyalkylene polyol obtained through an additional reaction between glycerin and ethylene oxide or an additional reaction between glycerin and propylene oxide.

As polyester polyol composing urethane prepolymer containing a hydroxyl group, there is available, for example, linear polyester having a hydroxyl group in a molecular chain, which is obtained through a reaction between a dibasic acid and a low molecular weight polyol. Applicable dibasic acids include adipic acid, azelaic acid, dodecanedioic acid, dimer acid, isophthalic acid, hexahydro-phthalic anhydride, terephthalic acid, dimethyl terephthalate, itaconic acid, fumaric acid, maleic anhydride, or ester of these acids.

As polyether-polyester polyol composing urethane prepolymer containing a hydroxyl group, there is available, for example, linear polyester having a hydroxyl group in a molecular chain, which is obtained through an esterifying reaction of a mixture of a dibasic acid and the above-mentioned polyether polyol or a mixture of a dibasic acid and a low molecular weight polyol; or polyether which is obtained through an additional reaction between polyester having a carboxyl group and/or a hydroxyl group at a terminal thereof and an alkylene oxide (ethylene oxide, propylene oxide, for example).

As the isocyanate compound composing urethane prepolymer containing a hydroxyl group, there is available, for example, hexamethylene diisocyanate; o, m or p-phenylene diisocyanate; 2,4 or 2,6-tolylene diisocyanate; an isocyanate compound having an aromatic ring, such as 2,4 or 2,6-tolylene diisocyanate, diphenyl methane-4,4'-diisocyanate, 3,3'-dimethyl-4,4'-biphenylene diisocyanate, dicyclohexyl methane-4,4'-diisocyanate, w,w'-diisocyanate-1,4-dimethyl benzene, w,w'-diisocyanate-1,3-dimethyl benzene, each having a hydrogenated aromatic ring; an alicyclic isocyanate compound such as isophorone diisocyanate; or various combination thereof.

As dihydric alcohol, there is available, for example, a hydroxy compound such as (i) ethylene glycol, (ii) butylene glycol such as 1,3 or 1,4-butanediol, (iii) diethylene glycol, or (iv) hydrogenated bisphenol A.

As the block polyisocyanate compound to serve as the curing agent, there is available block polyisocyanate prepolymer, which is obtained by blocking a polyisocyanate with the use of a known blocking agent, such as those commercially available in the brand names "BURNOCK D-550", "BURNOCK D-500", "BURNOCK B7-887" (manufactured by Dainippon Ink and Chemicals, Inc.), "TAKENATE N-815-N" (manufactured by Takeda Chemical Industries, Ltd.) and "ADDITOL VXL-80" (manufactured by Hoechst Gosei K.K.).

As the amino resin to serve as the curing agent, there is available, for example, a resin, which is obtained through a reaction between an amino component such as melamine urea acetoguanamine, benzoguanamine, steroguanamine or spiroguanamine; and an aldehyde component such as formaldehyde, paraform, acetoaldehyde or glyoxal; and an alcohol component such as methanol, ethanol, isopropanol, n-butanol, isobutanol or secbutanol.

The polyethylene resin is used as the solid internal lubricant because the polyethylene resin imparts an excellent lubricity to the resin film, thus improving press-formability of the zinciferous plated steel sheet. The polyethylene resin is a crystalline thermoplastic resin having in general an average molecular weight of from several hundreds to several millions. The polyethylene resin has a glass transition temperature of about $-100°$ C., which is lower than a room temperature, a melting point of from 90° to 140° C., and a critical surface tension of about 30 dyne/cm. Therefore, the polyethylene resin, being soft at a room temperature and low in wettability and adhesion, has an excellent lubricity. The particle size of the polyethylene resin should preferably be up to 20 $\mu$m from the point of view of dispersibility into the resin film.

The polyethylene resin used in the present invention should preferably have a melting point within a range of from 90° to 130° C. A polyethylene resin having a melting point of over 130° C. has a high deformation resistance at a temperature near the room temperature, thus resulting in a lower lubricity of the resin film. More preferably, the melting point of the polyethylene resin should be within a range of from 90° to 120° C. The polyethylene resin should preferably have an average molecular weight of up to 5,000 to ensure satisfactory coating property and lubricity of the resin film. Two or more polyethylene resins both having a melting point and an average molecular weight within the above-mentioned ranges may be used.

The content ratio of the solid internal lubricant comprising the polyethylene resin should be within a range of from 1 to 30 weight parts relative to 100 weight parts of a solid component in the solvent-base thermosetting resin. When the content ratio of the solid internal lubricant is under 1 weight part relative to 100 weight parts of the solid component in the solvent-base thermosetting resin, there is unavailable an improving effect of lubricity. When the content ratio of the solid internal lubricant is over 30 weight parts relative to 100 weight parts of the solid component in the solvent-base thermosetting resin, on the other hand, aggregation force of the resin in the resin film and strength of the resin film decrease, causing a problem of easy peeloff of the resin film during the press forming. The content ratio of the solid internal lubricant should more preferably be within a range of from 5 to 20 weight parts relative to 100 weight parts of the solid component in the solvent-base thermosetting resin.

At least one of a chromate compound or silica is used as the rust-preventive pigment. The chromate compound and silica have a function of further improving corrosion resistance of the zinciferous plated steel sheet. Presence of such a rust-preventive pigment in the resin film not only improves corrosion resistance of the zinciferous plated steel sheet in the form of a flat sheet, but also prevents deterioration of corrosion resistance of the resin film even upon the deformation thereof during the press forming.

As the chromate compound to serve as the rust-preventative preventive pigment, there is available, for example, calcium chromate, strontium chromate, barium chromate, lead chromate, zinc chromate, potassium zinc chromate and silver chromate. As silica to serve as the rust-preventive pigment, there is available, for example, hydrophobic silica or hydrophilic silica.

The content ratio of the above-mentioned rust-preventive pigment should be within a range of from 3 to 30 weight parts relative to 100 weight parts of the solid component in the solvent-base thermosetting resin. When the content ratio of the rust-preventive pigment is under 3 weight parts relative to 100 weight parts of the solid component in the solvent-base thermosetting resin, there is unavailable an improvement effect of corrosion resistance. When the content ratio of the rust-preventive pigment is over 30 weight parts relative to 100 weight parts of the solid component in the solvent-base thermosetting resin, on the other hand, a further improvement effect of corrosion resistance is unavailable, and furthermore, aggregation force of the resin in the resin film is degraded to cause a problem of easy peeloff of the resin film during the press forming. The content ratio of the rust-preventive pigment should more preferably be within a range of from 5 to 20 weight parts relative to 100 weight parts of the solid component in the solvent-base thermosetting resin.

It is necessary to form the chromate film on the zinciferous plating layer. More specifically, $Cr^{6+}$ chromate ions contained in the chromate film formed on the zinciferous plating layer bring about a passivation effect. In addition, since the surface of the zinciferous plating layer is covered with a hydrated chromium oxide film of $Cr^{3+}$, which is a reduction product of chromate ions, an anode area decreases, and the penetration of water or oxygen into the zinciferous plating layer is prevented. Corrosion resistance of the zinciferous plated steel sheet is improved as a result. The chromate film may be formed by any of such means as an application treatment, an electrolysis treatment, a reaction treatment and other known means.

The chromate film formed on the zinciferous plating layer should have a weight within a range of from 5 to 200 mg/m$^2$ as converted into metallic chromium per surface of the steel sheet. When the weight of the chromate film is under 5 mg/m$^2$ as converted into metallic chromium per surface of the steel sheet, an improving effect of corrosion resistance of the zinciferous plated steel sheet is unavailable. When the weight of the chromate film is over 200 mg/m$^2$ as converted into metallic chromium per surface of the steel sheet, on the other hand, not only a further improvement effect of corrosion resistance is unavailable, but also a problem of breakage of the chromate film is posed when the press forming is applied under severe conditions. The weight of the chromate film should more preferably be within a range of from 10 to 150 mg/m$^2$ as converted into metallic chromium per surface of the steel sheet.

The resin film should have a thickness within a range of from 0.3 to 3.0 μm. When the thickness of the resin film is under 0.3 μm, an improving effect of press-formability of the zinciferous plated steel sheet is unavailable. When the thickness of the resin film is over 3.0 μm, on the other hand, weldability of the zinciferous plated steel sheet is degraded, and if press-forming conditions are severe, such problems are posed as easy peeloff of the resin film, and peeled pieces of the resin film adhering onto the forming die.

Another resin film not containing a solid internal lubricant may be present between the chromate film on the zinciferous plating layer and the above-mentioned resin film. The total thickness of the resin films when such another resin film is present, should be up to 5.0 μm, or more preferably, up to 3.0 μm. A total thickness of the resin films of over 5.0 μm poses a problem of degradation of weldability.

The zinciferous plating layer formed on at least one surface of the steel sheet in the present invention may be a conventional zinc plating layer, or a conventional zinc alloy plating layer containing at least one of iron, nickel, manganese, molybdenum, cobalt, aluminum, chromium and silicon, in addition to zinc. The zinciferous plating layer may comprise a single zinc plating layer or a single zinc alloy plating layer, or a plurality of zinc plating layers or a plurality of zinc alloy plating layers, or at least one zinc plating layer and at least one zinc alloy plating layer.

The steel sheet, on at least one surface of which a zinciferous plating layer is to be formed may be a cold-rolled steel sheet, a hot-rolled steel sheet, or a stainless steel sheet.

The above-mentioned zinciferous plated steel sheet of the present invention is manufactured as follows:

A liquid resin prepared by mixing a solvent-base thermosetting resin, a solid internal lubricant and a rust-preventive pigment, each within the scope of the present invention at prescribed ratios and diluting the resultant mixture with a solvent, is applied onto the surface of the chromate film formed on the zinciferous plating layer. The liquid resin may be applied by any of the conventional methods such as the application by a roll, the application by a spray, the application by a curtain flow coater, the application by immersion and the like.

Then, the zinciferous plated steel sheet, in which the above-mentioned liquid resin has been applied onto the surface of the chromate film, is heated in a hot blast furnace or in an induction heating furnace to a temperature within a range of from 150° to 250° C. to evaporate the solvent in the liquid resin and cure the resin. A resin film is thus formed on the chromate film formed on the zinciferous plating layer.

A coloring agent, a surface-active agent and a stabilizer may be added as required to the above-mentioned liquid resin, in addition to the solvent-base thermosetting resin, the solid internal lubricant and the rust-preventive pigment.

Press-formability of the zinciferous plated steel sheet can further be improved by using a composite of a thermosetting resin having a glass transition temperature of up to 50° C. and a thermosetting resin having a glass transition temperature of over 50° C. as the above-mentioned solvent-base thermosetting resin in the resin film.

The reasons are as follows: The solvent-base thermosetting resin having a glass transition temperature of up to 50° C. has an excellent softness at low temperatures.

For a portion under gentle press-forming conditions or in a case with gentle press-forming conditions, therefore, the use of a solvent-base thermosetting resin having a glass transition temperature of up to 50° C. gives a better press-formability and an improved external appearance after the press forming to the zinciferous plated steel sheet. However, the solvent-base thermosetting resin having a glass transition temperature of up to 50° C. is poor in strength at high temperatures. For a portion under severe press-forming conditions or in a case with severe press-forming conditions, therefore, the resin film softens and peels off under the effect of frictional heat produced during the press forming, and peeled pieces of the resin film adhere onto the forming die. Press-formability and external appearance after the press forming of the zinciferous plated steel sheet may thus easily be degraded.

The solvent-base thermosetting resin having a glass transition temperature of over 50° C. is, on the other hand, excellent in strength at high temperatures. For a portion under severe press-forming conditions or in a case with severe press-forming conditions, therefore, the use of the solvent-base thermosetting resin having a glass transition temperature of over 50° C. results in a better press-formability and prevents occurrence of softening or peeloff of the resin film caused by frictional heat produced during the press forming, with a better external appearance after the press forming. However, the solvent-base thermosetting resin having a glass transition temperature of over 50° C. is poor in softness at low temperatures. For a portion under gentle press-forming conditions or in a case with gentle press-forming conditions, therefore, the resin film may pulverize and peel off, and peeled pieces of the resin film adhere onto the forming die, and this easily causes degradation of press-formability and external appearance after the press forming of the zinciferous plated steel sheet.

It is derived from the above description that, by combining a thermosetting resin having a glass transition temperature of up to 50° C., or more preferably, within a range of from 10° to 50° C. and a thermosetting resin having a glass transition temperature of over 50° C., or more preferably, within a range of from over 50° C. to 100° C. into a composite one as the solvent-base thermosetting resin in the resin film, press-formability can be improved both for a portion under gentle press-forming conditions or in a case with gentle press-forming conditions and for a portion under severe press-forming conditions or in a case wih severe press-forming conditions.

The weight ratio of the thermosetting resin having a glass transition temperature of up to 50° C. to the thermosetting resin having a glass transition temperature of over 50° C., should preferably be within a range of from 9:1 to 1:9. When this weight ratio is over 9: under 1, softening and peeloff may easily be produced in the resin film at a portion under severe press-forming conditions or in a case with severe press-forming conditions. When this weight ratio is under 1: over 9, on the other hand, pulverization and peeloff may easily be produced in the resin film at a portion under gentle press-form conditions or in a case with gentle press-forming conditions. The weight ratio of the thermosetting resin having a glass transition temperature of up to 50° C. to the thermosetting resin having a glass transition temperature of over 50° C. should more preferably be within a range of from 9:1 to 5:5.

The thermosetting resin having a glass transition temperature of up to 50° C. and the thermosetting resin having a glass transition temperature of over 50° C. described above, can be obtained by adjusting the chemical composition of urethane prepolymer containing a hydroxyl group.

Now, the zinciferous plated steel sheet of the present invention is described further in detail by means of examples while comparing with comparative examples.

EXAMPLE 1

Eight kinds of urethane prepolymer A to H containing a hydroxyl group as shown in Table 1 were prepared as the urethane prepolymer containing a hydroxyl group in the solvent-base thermosetting resin which was one of the components of the resin film. Five kinds of solid internal lubricant "a" to "e" as shown in Table 2 were prepared as the solid internal lubricant in the solvent-base thermosetting resin.

Urethane prepolymer containing a hydroxyl group was prepared as follows. Urethane prepolymer A containing a hydroxyl group as shown in Table 1 is described below. A reactor comprising a heater, a stirrer, a dewaterer and a thermometer was used. Aromatic polyester polyol in an amount of 915 weight parts and aliphatic polyester polyol in an amount of 915 weight parts were supplied into the reactor as the polyester polyol, and heated for melting in an inert atmosphere. The thus melted polyester polyol was heated to a temperature of 100° C. while stirring, held at the temperature of 100° C. for a period of from 30 to 60 minutes, and then dewatered. Then, the melted polyester polyol was cooled to a temperature of 70° C.

Then, 28 weight parts of 1,4-butanediol as the dihydric alcohol, 313 weight parts of diphenyl methane-4,4'-diisocyanate as the isocyanate compound, 0.55 weight parts of di-n-butyltindilaurate as the catalyst, and 940 weight parts of cyclohexanone as the solvent were added to the above-mentioned polyester polyol at a temperature of 70° C., mixed together, and caused to react for a period of from 5 to 10 hours. After a prescribed viscosity of this mixture was reached, 10 weight parts of 1,3-butanediol as the dihydric alcohol were added to this mixture. Then, 4,150 weight parts of cyclohexanone as the solvent were added to the resultant mixture, thereby preparing urethane prepolymer A containing a hydroxyl group, having 30% non-volatile matters and a viscosity of 1,400 cps.

Urethane prepolymers B to H containing a hydroxyl group as shown in Table 1 were prepared in the same manner as described above.

Hexamethylene diisocyanate trimer (brand name "BURNOCK B7-887" manufactured by Dainippon Ink and Chemicals, Inc.) was added at an equivalent ratio of NCO/OH=1/1 as the block polyisocyanate compound to serve as the curing agent, to each of the thus prepared urethane prepolymers A to H containing a hydroxyl group.

Eight kinds of solvent-base thermosetting resin, each comprising any one of the urethane prepolymers A to H containing a hydroxyl group and the block polyisocyanate compound as the curing agent, were thus prepared. The glass transition temperature of each of the eight kinds of solvent-base thermosetting resin thus obtained is also shown in Table 1.

TABLE 1

| Material | Urethane prepolymer containing hydroxyl group (weight parts) | | | | | | | |
|---|---|---|---|---|---|---|---|---|
| | A | B | C | D | E | F | G | H |
| Aromatic polyester polyol | 915 | 1255 | 915 | 1255 | 1830 | 2510 | 1830 | 2510 |
| Aliphatic polyester polyol | 915 | 1255 | 915 | 1255 | — | — | — | — |
| 1,4-butanediol (dihydric alcohol) | 28 | — | 28 | — | 28 | — | 28 | — |
| Diphenyl methane-4,4'-diisocyanate (isocyanate compound) | 313 | 313 | — | — | 313 | 313 | — | — |
| Isophorone diisocyanate (isocyanate compound) | — | — | 278 | 278 | — | — | 278 | 278 |
| Di-n-butyltin dilaurate (catalyst) | 0.55 | 0.55 | 0.55 | 0.55 | 0.55 | 0.55 | 0.55 | 0.55 |
| Cyclohexanone (solvent) | 940 | 1200 | 920 | 1200 | 940 | 1200 | 920 | 1200 |
| 1,3-butanediol (dihydric alcohol) | 10 | 10 | 10 | 10 | 10 | 10 | 10 | 10 |
| Cyclohexanone (solvent) | 4150 | 5400 | 4100 | 5300 | 4150 | 5400 | 4100 | 5300 |
| Non-volatile matters (%) | 30 | 30 | 30 | 30 | 30 | 30 | 30 | 30 |
| Viscosity (cps) | 1400 | 270 | 630 | 320 | 250 | 1290 | 220 | 550 |
| Glass transition temperature (°C.) | 14 | 32 | 25 | 45 | 54 | 73 | 63 | 87 |

TABLE 2

| | Item | Melting point (°C.) | Molecular weight |
|---|---|---|---|
| a | Polyethylene resin | 105 | 1500 |
| b | Polyethylene resin | 115 | 3000 |
| c | Saturated hydrocarbon compound | 58 | — |
| d | Polytetrafluoroethylene | 325 | — |
| e | Molybdenum disulfide | — | — |

A zinc electroplating layer having a plating weight of 20 g/m² per surface of a steel sheet was formed by a known zinc electroplating on each of the both surfaces of a cold-rolled steel sheet having a thickness of 0.8 mm. After degreasing the surface of the thus formed zinc electroplating layer with an alkali solution, a known chromating solution was applied with a roll onto the surface of the degreased zinc electroplating layer, then heated and dried. A chromate film having a weight of 50 mg/m² as converted into metallic chromium per surface of the steel sheet was thus formed on the surface of the zinc electroplating layer.

A liquid resin, which comprised the solvent-base thermosetting resin comprising any one of the urethane prepolymers A to H containing a hydroxyl group as shown in Table 1, the solid internal lubricant "a" as shown in Table 2 and silica as the rust-preventive pigment, was applied with a roll onto the above-mentioned chromate film. Then, the zinc electroplated steel sheet thus applied with the liquid resin was heated in an induction heating furnace to a temperature of 200° C. to form a resin film having a thickness of about 1.5 μm on the chromate film. Samples of the zinciferous plated steel sheet within the scope of the present invention (hereinafter referred to as the "samples of the invention") Nos. 1 to 8 were thus prepared as shown in Table 3.

For comparison purposes, a resin film having a thickness of about 1.5 μm was formed on the chromate film in the same manner as described above, with the use of a liquid resin which comprised a resin outside the scope of the present invention, the solid internal lubricant "a" as shown in Table 2 and silica as the rust-preventive pigment. Samples of a zinciferous plated steel sheet outside the scope of the present invention (hereinafter referred to as the "samples for comparison") Nos. 1 to 3, and another sample for comparison No. 4 applied with a lubricant oil in an amount of 2 g/m² onto the chromate film, without a resin film, were thus prepared also as shown in Table 3.

For each of the samples of the invention Nos. 1 to 8 and the samples for comparison Nos. 1 to 4 as described above, lubricity, press-formability, external appearance after the press forming, corrosion resistance in the form of a flat sheet, i.e., corrosion resistance before the press forming, and corrosion resistance after the press forming were evaluated through performance tests as described below. The results of evaluation are shown in Table 4.

TABLE 3

| | No. | Weight of chromate film (mg/m²) | Solvent-base thermo-setting resin | Solid internal lubricant Kind | Solid internal lubricant Content (weight parts) | Rust-preventive pigment Kind | Rust-preventive pigment Content (weight parts) |
|---|---|---|---|---|---|---|---|
| Sample of the invention | 1 | 50 | Prepolymer A | a | 10 | Silica | 10 |
| | 2 | 50 | Prepolymer B | a | 10 | " | 10 |
| | 3 | 50 | Prepolymer C | a | 10 | " | 10 |
| | 4 | 50 | Prepolymer D | a | 10 | " | 10 |
| | 5 | 50 | Prepolymer E | a | 10 | " | 10 |
| | 6 | 50 | Prepolymer F | a | 10 | " | 10 |
| | 7 | 50 | Prepolymer G | a | 10 | " | 10 |
| | 8 | 50 | Prepolymer H | a | 10 | " | 10 |
| Sample for comparison | 1 | 50 | Moisture-setting polyurethane | a | 10 | " | 10 |
| | 2 | 50 | Amino-resin-setting bisphenol (type A epoxy) | a | 10 | " | 10 |
| | 3 | 50 | Acrylic emulsion | a | 10 | " | 10 |
| | 4 | 50 | (lubricant oil) | — | — | — | — |

TABLE 4

| | No. | Lubricity 20° C. | Lubricity 150° C. | Press-form-ability | External appearance after press forming | Corrosion resistance before press forming (Hr) | Corrosion resistance after press forming |
|---|---|---|---|---|---|---|---|
| Sample of the invention | 1 | 0.07 | 0.09 | 2.33 | ◯ | 320 | ◯ |
| | 2 | 0.07 | 0.09 | 2.33 | ◯ | 320 | ◯ |
| | 3 | 0.07 | 0.09 | 2.33 | ◯ | 320 | ◯ |
| | 4 | 0.07 | 0.09 | 2.33 | ◯ | 320 | ◯ |
| | 5 | 0.07 | 0.06 | 2.33 | ◯ | 320 | ◯ |
| | 6 | 0.07 | 0.06 | 2.33 | ◯ | 320 | ◯ |
| | 7 | 0.07 | 0.06 | 2.33 | ◯ | 320 | ◯ |
| | 8 | 0.07 | 0.06 | 2.33 | ◯ | 320 | ◯ |
| Sample for comparison | 1 | 0.09 | 0.12 | 2.26 | ◯ | 320 | △ |
| | 2 | 0.10 | 0.15 | 2.28 | △ | 320 | ◯ |
| | 3 | 0.10 | 0.20 | 2.22 | △ | 320 | △ |
| | 4 | 0.14 | 0.18 | 2.23 | X | 120 | X |

(1) Lubricity test:

Lubricity of each sample was investigated by the use of a tester shown in the schematic front view of FIG. 1.

As shown in FIG. 1, the tester comprised a female die 1 having a flat surface and fixed to a side 2a of a box-shaped frame 2, a male die 4 facing the flat surface of the female die 1 and having a substantially horizontal projection 3 with a prescribed height, and a hydraulic cylinder 5, fixed to the other side 2b of the box-shaped frame 2, for supporting the male die 4 and moving same horizontally toward the female die 1. The male die 4 was fixed through a load cell 6 to a rod 5a of the hydraulic cylinder 5.

A sample 7 (i.e., each of the samples of the invention Nos. 1 to 8 and the samples for comparison Nos. 1 to 4) was vertically inserted into a gap between the female die 1 and the male die 4, and pressed by the female die 1 and the male die 4 at a pressure of 500 kgf/cm² by actuating the hydraulic cylinder 5. Then, the sample 7 was pulled out upward at a speed of 100 mm/minute as indicated by the arrow in FIG. 1. A dynamic frictional coefficient at this moment was determined to evaluate lubricity of the sample 7. In addition to the samples at a room temperature of 20° C., the lubricity test was carried out also for the samples at a high temperature of 150° C., taking account of the temperature increase produced during the press forming.

(2) Press-formability test:

A plurality of disks having various diameters were cut out from each of the samples of the invention Nos. 1 to 8 and the samples for comparison Nos. 1 to 4. Each of the disks thus cut out was press-formed into a cup shape under conditions including a punch diameter of 50 mm, a die diameter of 51.91 mm, and a wrinkle inhibiting force of 1 ton to investigate a limiting drawing ratio (the ratio of maximum diameter of a disk before the occurrence of buckling to the punch diameter), and press-formability was evaluated by means of the limiting drawing ratio.

Figure 2:
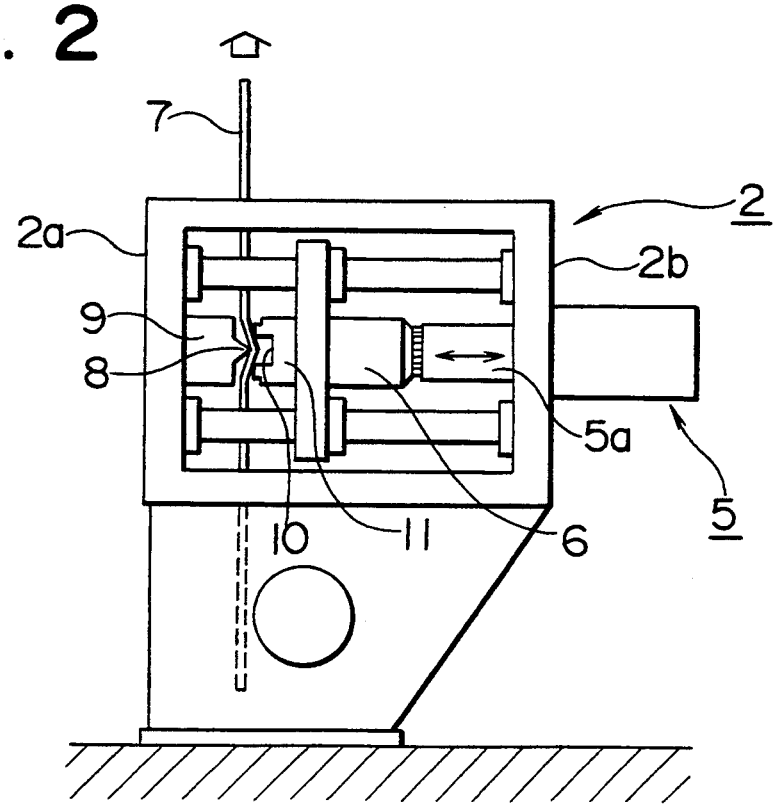
FIG. 2 is a schematic front view illustrating a tester for testing external appearance of a zinciferous plated steel sheet after the press forming.

(3) Test for external appearance after press forming:

The external appearance after the press forming of each sample was investigated by the use of a tester shown in the schematic front view of FIG. 2.

As shown in FIG. 2, the tester comprises a male die 9, having a substantially horizontal projection 8 with a prescribed height and fixed to a side 2a of a box-shaped frame 2, a female die 11 having a groove 10 with a prescribed depth and facing the projection 8 of the male die 9, and a hydraulic cylinder 5, fixed to the other side 2b of the box-shaped frame 2, for supporting the female die 11 and moving same horizontally toward the projection of the male die 9. The female die 11 is fixed through a load cell 6 to a rod 5a of the hydraulic cylinder 5.

A sample 7 (i.e., each of the samples of the invention Nos. 1 to 8 and the samples for comparison Nos. 1 to 4) was vertically inserted into a gap between the female die 11 and the male die 9, and pressed by the female die 11 and the male die 9 at a pressure of 500 kgf/cm² by actuating the hydraulic cylinder 5. Then, the sample 7 was pulled out upward at a speed of 100 mm/minute as indicated by the arrow in FIG. 2. Flaws and blackening produced in the resin film of the sample 7 thus pulled out were visually inspected, and external appearance after the press forming of the sample 7 was evaluated in terms of the state of the production of flaws and blackening. The criteria for evaluation were as follows:

⊙: No flaws nor blackening produced, with a very uniform external appearance;

○: Almost no flaws nor blackening produced, with a substantially uniform external appearance;

Δ: Flaws and blackening locally produced, with a non-uniform external appearance; and ×: Considerable flaws and blackening produced, with remarkably non-uniform external appearance.

(4) Test for corrosion resistance before press forming:

Each of the samples of the invention Nos. 1 to 8 and the samples for comparison Nos. 1 to 4 was subjected to a salt water spray test under JIS (Japanese Industrial Standards) Z 2371 to investigate the time before the occurrence of white rust, and corrosion resistance before the press forming was evaluated by means of the results obtained.

(5) Test for corrosion resistance after press forming:

With the use of the tester as shown in FIG. 2, a sample 7 (i.e., each of the samples of the invention Nos. 1 to 8 and the samples for comparison Nos. 1 to 4) was pressed by the male die 9 and the female die 11, and then pulled out upward. A tar-epoxy paint was applied onto the edge of the sample 7 thus pulled out, and the sample 7 was then subjected to a salt water spray test under JIS Z 2371 for 120 hours, and the occurrence ratio of white rust on the sample 7 was investigated upon the lapse of 120 hours. Corrosion resistance after the press forming was evaluated by means of the results obtained. The evaluation criteria were as follows:

⊙: Occurrence ratio of white rust: under 5%;

○: Occurrence ratio of white rust: from 5 to under 20%;

Δ: Occurrence ratio of white rust: from 20 to under 40%; and

×: Occurrence ratio of white rust: at least 40%.

As is evident from Tables 3 and 4, the sample for comparison No. 1 having the resin film comprising moisture-setting polyurethane outside the scope of the present invention was poor in lubricity, press-formability, and corrosion resistance after the press forming. The sample for comparison No. 2 having the resin film comprising amino-resin-setting bisphenol (type A epoxy) outside the scope of the present invention was poor in lubricity, press-formability, and external appearance after the press forming. The sample for comparison No. 3 having the resin film comprising acrylic emulsion outside the scope of the present invention was poor in lubricity, press-formability, external appearance after the press forming, and corrosion resistance after the press forming. The sample for comparison No. 4 only applied with a lubricant oil on the chromate film was poor in all of lubricity, press-formability, external appearance after the press forming, corrosion resistance before the press forming, and corrosion resistance after the press forming.

In contrast, all the samples of the invention Nos. 1 to 8 were excellent in all of lubricity, press-formability, external appearance after the press forming, corrosion resistance before the press forming, and corrosion resistance after the press forming.

EXAMPLE 2

A chromate film having a weight within the scope of the present invention was formed on the zinc electroplating layer in the same manner as in Example 1. Then, there was formed, on the chromate film, a resin film having a thickness within the scope of the present invention, which comprised the solvent-base thermosetting resin comprising urethane prepolymer A containing a hydroxyl group as shown in Table 1, the solid internal lubricant "a" or "b" as shown in Table 2 in an amount within the scope of the present invention, and silica or strontium chromate as the rust-preventive-pigment in an amount within the scope of the present invention. Samples of the invention Nos. 9 to 19 as shown in Table 5 were thus prepared.

For comparison purposes, there were prepared samples for comparison Nos. 5 to 13, also shown in Table 5, in which any one of the kind and the content of the solid internal lubricant in the resin film, the content of the rust-preventive pigment, the thickness of the resin film and the weight of the chromate film, was outside the scope of the present invention.

For each of the above-mentioned samples of the invention Nos. 9 to 19 and the samples for comparison Nos. 5 to 13, lubricity, press-formability, external appearance after the press forming, corrosion resistance before the press forming, and corrosion resistance after the press forming were evaluated through the performance tests as described above. The results of evaluation are shown in Table 6.

TABLE 5

|  | No. | Weight of chromate film (mg/m²) | Solvent-base thermo-setting resin | Solid internal lubricant Kind | Solid internal lubricant Content (weight parts) | Rust-preventive pigment Kind | Rust-preventive pigment Content (weight parts) | Thickness of resin film (μm) |
|---|---|---|---|---|---|---|---|---|
| Sample | 9 | 50 | Prepolymer A | a | 10 | Silica | 10 | 1.5 |
| of the | 10 | 50 | " | b | 10 | " | 10 | 1.5 |
| inven- | 11 | 50 | " | a | 5 | " | 10 | 1.5 |
| tion | 12 | 50 | " | a | 30 | " | 10 | 1.5 |
|  | 13 | 50 | " | a | 10 | " | 5 | 1.5 |
|  | 14 | 50 | " | a | 10 | " | 20 | 1.5 |
|  | 15 | 15 | " | a | 10 | " | 10 | 1.5 |
|  | 16 | 200 | " | a | 10 | " | 10 | 1.5 |
|  | 17 | 50 | " | a | 10 | " | 10 | 0.5 |

TABLE 5-continued

| | No. | Weight of chromate film (mg/m²) | Solvent-base thermo-setting resin | Solid internal lubricant Kind | Solid internal lubricant Content (weight parts) | Rust-preventive pigment Kind | Rust-preventive pigment Content (weight parts) | Thickness of resin film (μm) |
|---|---|---|---|---|---|---|---|---|
| | 18 | 50 | " | a | 10 | " | 10 | 3.0 |
| | 19 | 50 | " | a | 10 | Strontium chromate | 10 | 1.5 |
| Sample | 5 | 50 | " | c | 10 | Silica | 10 | 1.5 |
| for | 6 | 50 | " | d | 10 | " | 10 | 1.5 |
| com- | 7 | 50 | " | e | 10 | " | 10 | 1.5 |
| pari- | 8 | 50 | " | a | 0.5 | " | 10 | 1.5 |
| son | 9 | 50 | " | a | 50 | " | 10 | 1.5 |
| | 10 | 50 | " | a | 10 | " | 2 | 1.5 |
| | 11 | 50 | " | a | 10 | " | 40 | 1.5 |
| | 12 | 300 | " | a | 10 | " | 10 | 1.5 |
| | 13 | 50 | " | a | 10 | " | 10 | 0.2 |

TABLE 6

| | No. | Lubricity 20° C. | Lubricity 150° C. | Press-form-ability | External appearance after press forming | Corrosion resistance before press forming (Hr) | Corrosion resistance after press forming |
|---|---|---|---|---|---|---|---|
| Sample | 9 | 0.07 | 0.09 | 2.33 | ○ | 320 | ○ |
| of the | 10 | 0.07 | 0.09 | 2.33 | ○ | 320 | ○ |
| inven- | 11 | 0.09 | 0.11 | 2.31 | ○ | 320 | ○ |
| tion | 12 | 0.06 | 0.07 | 2.35 | ○ | 320 | ○ |
| | 13 | 0.07 | 0.09 | 2.33 | ○ | 300 | ○ |
| | 14 | 0.07 | 0.09 | 2.33 | ○ | 400 | ○ |
| | 15 | 0.07 | 0.09 | 2.33 | ○ | 280 | ○ |
| | 16 | 0.09 | 0.11 | 2.31 | ○ | 450 | ○ |
| | 17 | 0.09 | 0.11 | 2.31 | ○ | 280 | ○ |
| | 18 | 0.06 | 0.07 | 2.35 | ○ | 450 | ○ |
| | 19 | 0.07 | 0.09 | 2.33 | ○ | 320 | ○ |
| Sample | 5 | 0.06 | 0.17 | 2.31 | Δ | 320 | ○ |
| for | 6 | 0.16 | 0.17 | 2.18 | ○ | 320 | ○ |
| compar- | 7 | 0.22 | 0.22 | 2.13 | X | 240 | X |
| ison | 8 | 0.17 | 0.17 | 2.20 | Δ | 320 | Δ |
| | 9 | 0.10 | 0.14 | 2.33 | ○ | 240 | Δ |
| | 10 | 0.07 | 0.09 | 2.33 | ○ | 240 | Δ |
| | 11 | 0.10 | 0.12 | 2.23 | Δ | 400 | Δ |
| | 12 | 0.09 | 0.11 | 2.23 | Δ | 480 | ○ |
| | 13 | 0.18 | 0.18 | 2.18 | X | 160 | X |

As is evident from Tables 5 and 6, the sample for comparison No. 5 having the resin film containing the solid internal lubricant "c" outside the scope of the present invention, i.e., a saturated hydrocarbon compound, was poor in lubricity at high temperatures and external appearance after the press forming. The sample for comparison No. 6 having the resin film containing the solid internal lubricant "d" outside the scope of the present invention, i.e., polytetrafluoroethylene, was poor in lubricity and press-formability. The sample for comparison No. 7 having the resin film containing the solid internal lubricant "e" outside the scope of the present invention, i.e., molybdenum disulfide, was poor in lubricity, press-formability, external appearance after the press forming, corrosion resistance before the press forming, and corrosion resistance after the press forming.

The sample for comparison No. 8, while using the solid internal lubricant "a" within the scope of the present invention, having the resin film with a small amount of the solid internal lubricant outside the scope of the present invention, was poor in lubricity, press-formability, external appearance after the press forming, and corrosion resistance after the press forming. The sample for comparison No. 9 having the resin film containing the solid internal lubricant "a" in a large amount outside the scope of the present invention, and the sample for comparison No. 10 having the resin film containing the rust-preventive pigment in a small amount outside the scope of the present invention, were poor in corrosion resistance before the press forming, and corrosion resistance after the press forming. The sample for comparison No. 11 having the resin film containing the rust-preventive pigment in a large amount outside the scope of the present invention, was poor in press-formability, external appearance after the press forming and corrosion resistance after the press forming.

The sample for comparison No. 12 in which the weight of the chromate film was large outside the scope of the present invention, was poor in press-formability and external appearance after the press forming. The sample for comparison No. 13 in which the thickness of the resin film was smaller outside the scope of the present invention, was poor in all of lubricity, press-formability, external appearance after the press forming, corrosion resistance before the press forming, and corrosion resistance after the press forming.

In contrast, the samples of the invention Nos. 9 to 19 were excellent in all of lubricity, press-formability, external appearance after the press forming, corrosion resistance before the press forming, and corrosion resistance after the press forming.

EXAMPLE 3

As the solvent-base thermosetting resin, there was used a mixture of a thermosetting resin comprising any one of the urethane perpolymers A, B, C, and D containing a hydroxyl group as shown in Table 1 and having a glass transition temperature of up to 50° C., and another thermosetting resin comprising any one of the urethane prepolymers E, F, G, and H containing a hydroxyl group also shown in Table 1 and having a glass transition temperature of over 50° C. were employed.

A chromate film having a weight within the scope of the present invention was formed on the zinc electroplating layer in the same manner as in Example 1. Then, there was formed, on the chromate film, a resin film having a thickness of about 1.5 μm, which comprised a solvent-base thermosetting resin in which any one of the urethane prepolymers A, B, C, and D containing a hydroxyl group as shown in Table 1, and any one of the urethane prepolymers E, F, G, and H containing a hydroxyl group as shown in Table 1, were mixed at a prescribed weight ratio, the solid internal lubricant "a" as shown in Table 2, and silica as the rust-preventive pigment. Samples of the invention Nos. 20 to 28 as shown in Table 7 were thus prepared.

For each of the above-mentioned samples of the invention Nos. 20 to 28, lubricity, press-formability, external appearance after the press forming, corrosion resistance before the press forming, and corrosion resistance after the press forming were evaluated through the performance tests as described above. The results of evaluation are shown in Table 8.

having a glass transition temperature of up to 50° C. and the solvent-base thermosetting resin having a glass transition temperature of over 50° C., were further more excellent in lubricity, press-formability, external appearance after the press forming and corrosion resistance after the press forming.

EXAMPLE 4

As the solvent-base thermosetting resin, there was used a mixture of a thermosetting resin having a glass transition temperature of up to 50° C. and comprising the urethane prepolymer A containing a hydroxyl group as shown in Table 1, and another thermosetting resin having a glass transition temperature of over 50° C. and comprising the urethane prepolymer E containing a hydroxyl group also shown in Table 1. The weight ratio of the thermosetting resin having a glass transition temperature of up to 50° C. to the thermosetting resin having a glass transition temperature of over 50° C., was 8:2.

A chromate film having a weight within the scope of the present invention was formed on the zinc electroplating layer in the same manner as in Example 1. Then, there was formed, on the chromate film, a resin film having a thickness within the scope of the present invention, which comprised the above-mentioned two solvent-base thermosetting resins having different glass transition temperatures, the solid internal lubricant "a" or "b" as shown in Table 2 in an amount within the scope of the present invention, and silica as the rust-preventive pigment in an amount within the scope of the present invention. Samples of the invention Nos. 29 to 38 as shown in Table 9 were thus prepared.

For comparison purposes, there were prepared samples for comparison Nos. 14 to 22, also shown in Table 9, in which any one of the kind and the content of the solid internal lubricant in the resin film, the content of the rust-preventive pigment, the thickness of the resin

TABLE 7

| | No. | Weight of chromate film (mg/m$^2$) | Solvent-base thermosetting resin | | Solid internal lubricant | | Rust-preventive pigment | |
|---|---|---|---|---|---|---|---|---|
| | | | Combination of prepolymers | Weight ratio of prepolymers | Kind | Content (weight parts) | Kind | Content (weight parts) |
| Sample | 20 | 50 | A + E | 8:2 | a | 10 | Silica | 10 |
| of the | 21 | 50 | A + F | 8:2 | a | 10 | " | 10 |
| inven- | 22 | 50 | A + G | 8:2 | a | 10 | " | 10 |
| tion | 23 | 50 | A + H | 8:2 | a | 10 | " | 10 |
| | 24 | 50 | B + H | 8:2 | a | 10 | " | 10 |
| | 25 | 50 | C + H | 8:2 | a | 10 | " | 10 |
| | 26 | 50 | D + H | 8:2 | a | 10 | " | 10 |
| | 27 | 50 | A + H | 9:1 | a | 10 | " | 10 |
| | 28 | 50 | A + H | 1:9 | a | 10 | " | 10 |

TABLE 8

| | No. | Lubricity 20° C. | Lubricity 150° C. | Press-formability | External appearance after press forming | Corrosion resistance before press forming (Hr) | Corrosion resistance after press forming |
|---|---|---|---|---|---|---|---|
| Sample | 20 | 0.06 | 0.05 | 2.35 | ⊚ | 320 | ⊚ |
| of the | 21 | 0.06 | 0.05 | 2.35 | ⊚ | 320 | ⊚ |
| inven- | 22 | 0.06 | 0.05 | 2.35 | ⊚ | 320 | ⊚ |
| tion | 23 | 0.06 | 0.05 | 2.35 | ⊚ | 320 | ⊚ |
| | 24 | 0.06 | 0.05 | 2.35 | ⊚ | 320 | ⊚ |
| | 25 | 0.06 | 0.05 | 2.35 | ⊚ | 320 | ⊚ |
| | 26 | 0.06 | 0.05 | 2.35 | ⊚ | 320 | ⊚ |
| | 27 | 0.06 | 0.06 | 2.35 | ⊚ | 320 | ⊚ |
| | 28 | 0.06 | 0.05 | 2.35 | ⊚ | 320 | ⊚ |

As is evident from comparison of Table 8 above and Table 4 of the above-mentioned Example 1, the samples of the invention Nos. 20 to 28, each having the resin film which comprised the solvent-base thermosetting resin film and the weight of the chromate film, was outside the scope of the present invention.

For each of the above-mentioned samples of the invention Nos. 29 to 38 and the samples for comparison Nos. 14 to 22, lubricity, press-formability, external appearance after the press forming, corrosion resistance before the press forming, and corrosion resistance after the press forming were evaluated through the performance tests as described above. The results of evaluation are shown in Table 10.

TABLE 9

| | No. | Weight of chromate film (mg/m$^2$) | Solvent-base thermo-setting resin | Solid internal lubricant Kind | Solid internal lubricant Content (weight parts) | Rust-preventive pigment Kind | Rust-preventive pigment Content (weight parts) | Thickness of resin film (μm) |
|---|---|---|---|---|---|---|---|---|
| Sample of the invention | 29 | 50 | Prepolymers A + E | a | 10 | Silica | 10 | 1.5 |
| | 30 | 50 | Prepolymers A + E | b | 10 | " | 10 | 1.5 |
| | 31 | 50 | Prepolymers A + E | a | 5 | " | 10 | 1.5 |
| | 32 | 50 | Prepolymers A + E | a | 30 | " | 10 | 1.5 |
| | 33 | 50 | Prepolymers A + E | a | 10 | " | 5 | 1.5 |
| | 34 | 50 | Prepolymers A + E | a | 10 | " | 20 | 1.5 |
| | 35 | 15 | Prepolymers A + E | a | 10 | " | 10 | 1.5 |
| | 36 | 200 | Prepolymers A + E | a | 10 | " | 10 | 1.5 |
| | 37 | 50 | Prepolymers A + E | a | 10 | " | 10 | 0.5 |
| | 38 | 50 | Prepolymers A + E | a | 10 | " | 10 | 3.0 |
| Sample for comparison | 14 | 50 | Prepolymers A + E | c | 10 | " | 10 | 1.5 |
| | 15 | 50 | Prepolymers A + E | d | 10 | " | 10 | 1.5 |
| | 16 | 50 | Prepolymers A + E | e | 10 | " | 10 | 1.5 |
| | 17 | 50 | Prepolymers A + E | a | 0.5 | " | 10 | 1.5 |
| | 18 | 50 | Prepolymers A + E | a | 50 | " | 10 | 1.5 |
| | 19 | 50 | Prepolymers A + E | a | 10 | " | 2 | 1.5 |
| | 20 | 50 | Prepolymers A + E | a | 10 | " | 40 | 1.5 |
| | 21 | 300 | Prepolymers A + E | a | 10 | " | 10 | 1.5 |
| | 22 | 50 | Prepolymers A + E | a | 10 | " | 10 | 0.2 |

TABLE 10

| | No. | Lubricity 20° C. | Lubricity 150° C. | Press-form-ability | External appearance after press forming | Corrosion resistance before press forming (Hr) | Corrosion resistance after press forming |
|---|---|---|---|---|---|---|---|
| Sample of the invention | 29 | 0.06 | 0.05 | 2.35 | ⊙ | 320 | ⊙ |
| | 30 | 0.06 | 0.05 | 2.35 | ⊙ | 320 | ⊙ |
| | 31 | 0.08 | 0.07 | 2.33 | ⊙ | 320 | ⊙ |
| | 32 | 0.05 | 0.04 | 2.38 | ⊙ | 320 | ⊙ |
| | 33 | 0.06 | 0.05 | 2.35 | ⊙ | 300 | ⊙ |
| | 34 | 0.06 | 0.05 | 2.35 | ⊙ | 400 | ⊙ |
| | 35 | 0.06 | 0.05 | 2.35 | ⊙ | 280 | ⊙ |
| | 36 | 0.08 | 0.07 | 2.33 | ⊙ | 450 | ⊙ |
| | 37 | 0.08 | 0.07 | 2.33 | ⊙ | 280 | ○ |
| | 38 | 0.08 | 0.04 | 2.38 | ⊙ | 450 | ⊙ |
| Sample for comparison | 14 | 0.05 | 0.13 | 2.33 | △ | 320 | ○ |
| | 15 | 0.15 | 0.13 | 2.20 | ○ | 320 | ○ |
| | 16 | 0.21 | 0.17 | 2.15 | X | 240 | X |
| | 17 | 0.16 | 0.13 | 2.22 | △ | 320 | △ |
| | 18 | 0.09 | 0.09 | 2.35 | ○ | 240 | △ |
| | 19 | 0.08 | 0.05 | 2.35 | ⊙ | 240 | △ |
| | 20 | 0.09 | 0.09 | 2.25 | △ | 400 | △ |
| | 21 | 0.08 | 0.07 | 2.25 | △ | 480 | ○ |
| | 22 | 0.17 | 0.14 | 2.20 | X | 160 | X |

As is evident from Tables 9 and 10, the sample for comparison No. 14 having the resin film containing the solid internal lubricant "c" outside the scope of the present invention, i.e., a saturated hydrocarbon compound, was poor in lubricity at high temperatures and external appearance after the press forming. The sample for comparison No. 15 having the resin film containing the solid internal lubricant "d" outside the scope of the present invention, i.e., polytetrafluoroethylene, was poor in lubricity and press formability. The sample for comparison No. 16 having the resin film containing the solid internal lubricant "e" outside the scope of the present invention, i.e., molybdenum disulfide, was poor in lubricity, press-formability, external appearance after the press forming, corrosion resistance before the press forming, and corrosion resistance after the press forming.

The sample for comparison No. 17, while using the solid internal lubricant "a" within the scope of the present invention, having the resin film with a small amount of the solid internal lubricant outside the scope of the present invention, was poor in lubricity, press-formability, external appearance after the press forming, and corrosion resistance after the press forming. The sample for comparison No. 18 having the resin film containing the solid internal lubricant "a" in a large amount outside the scope of the present invention, and the sample for comparison No. 19 having the resin film containing the rust-preventive pigment in a small amount outside the scope of the present invention, were poor in corrosion resistance before the press forming, and corrosion resistance after the press forming. The sample for comparison No. 20 having the resin film containing the rust-preventive pigment in a large amount outside the scope of the present invention, was poor in press-formability, external appearance after the press forming and corrosion resistance after the press forming.

The sample for comparison No. 21 in which the weight of the chromate film was large outside the scope of the present invention, was poor in press-formability and external appearance after the press forming. The sample for comparison No. 22 in which the thickness of the resin film was small outside the scope of the present invention, was poor in all of lubricity, press-formability, external appearance after the press forming, corrosion resistance before the press forming, and corrosion resistance after the press forming.

In contrast, the samples of the invention Nos. 29 to 38 were excellent in all of lubricity, press-formability, external appearance after the press forming, corrosion resistance before the press forming, and corrosion resistance after the press forming.

According to the present invention, as described above in detail, it is possible to provide a zinciferous plated steel sheet excellent in press-formability and corrosion resistance, which permits the prevention of peeloff of, or damage to, the resin film formed on the chromate film on the zinciferous plating layer, even under severe press-forming conditions, thus providing many industrially useful effects.

What is claimed is:

1. In a zinciferous plated steel sheet excellent in press-formability and corrosion resistance, which comprises:
   a steel sheet;
   a zinciferous plating layer formed on at least one surface of said steel sheet;
   a chromate film formed on said zinciferous plating layer, said chromate film having a weight within a range of from 5 to 200 mg/m$^2$ as converted into metallic chromium per surface of said steel sheet; and
   a resin film formed on said chromate film by applying a resin onto said chromate film and then curing same, said resin film having a thickness within a range of from 0.3 to 3.0 μm;
   the improvement wherein:
   said resin film comprises a solvent-base thermosetting resin, a solid internal lubricant and a rust-preventive pigment;
   said solvent-base thermosetting resin comprises:
   (A) urethane prepolymer containing a hydroxyl group and having the following chemical composition:
   (a) at least one polyol selected from the group consisting of polyether polyol, polyester polyol and polyether-polyester polyol;
   (b) an isocyanate compound, and
   (c) dihydric alcohol, and
   (B) at least one of a block polyisocyanate compound and an amino resin as a curing agent;
   said solid internal lubricant comprises a polyethylene resin, and the content ratio of said solid internal lubricant is within a range of from 1 to 30 weight parts relative to 100 weight parts of a solid component in said solvent-base thermosetting resin; and
   said rust-preventive pigment comprises at least one of a chromate compound or silica, and the content ratio of said rust-preventive pigment is within a range of from 3 to 30 weight parts relative to 100 weight parts of said solid component in said solvent-base thermosetting resin.

2. A zinciferous plated steel sheet as claimed in claim 1, wherein:
   said solvent-base thermosetting resin comprises a composite of a thermosetting resin having a glass transition temperature of up to 50° C. and another thermosetting resin having a glass transition temperature of over 50° C., which are available by adjusting said chemical composition of said urethane prepolymer containing a hydroxyl group; and
   the weight ration of said thermosetting resin having a glass transition temperature of up to 50° C. to said another thermosetting resin having a glass transition temperature of over 50° C. is within a range of from 9:1 to 1:9.

3. A zinciferous plated steel sheet as claimed in claims 1 or 2, wherein:
   said solid internal lubricant comprising polyethylene resin has a melting point within a range of from 90° to 130° C.

4. A zinciferous plated steel sheet as claimed in claim 3, wherein:
   said chromate film has a weight within a range of from 10 to 150 mg/m$^2$ as converted into metallic chromium per surface of said steel sheet;
   said solvent-base thermosetting resin comprises a composite of a thermosetting resin having a glass transition temperature of from 10° C. to 50° C. and another thermosetting resin having a glass transition temperature of from over 50° to 100° C., the weight ratio of said thermosetting resin having a glass transition temperature of from 10° C. to 50° C. to said thermosetting resin having a glass transition temperature of from over 50° C. to 100° C. is within a range of from 9:1 to 5:5;
   said content ratio of said polyethylene solid internal lubricant is from 5 to 20 weight parts, said solid polyethylene having a particle size of up to 20 μm, and said polyethylene having a melting point of from 90° to 140° C.; and said content ratio of said rust-preventive pigment is from 5 to 20 weight parts.

5. A zinciferous plated steel sheet as claimed in claim 4, wherein said polyethylene has a glass transition temperature of about −100° C., a melting point of from 90° to 120° C., and a critical surface tension of about 30 dyne-cm.

6. A zinciferous plated steel sheet as claimed in claim 5, wherein said rust-preventive pigment is silica or strontium chromate.

* * * * *